United States Patent
Madic et al.

(10) Patent No.: US 10,420,439 B2
(45) Date of Patent: Sep. 24, 2019

(54) SINGLE LIQUID PROTEIN BEVERAGE DISPENSING SYSTEM

(71) Applicant: Ez Protein LLC, Pueblo, CO (US)

(72) Inventors: Kurt R. Madic, Pueblo, CO (US);
Ryan J. Madic, Pueblo, CO (US);
Zachary E. Conrad, Denver, CO (US)

(73) Assignee: EZ PROTEIN LLC, Pueblo, CO (US)

(*) Notice: Subject to any disclaimer, the term of this patent is extended or adjusted under 35 U.S.C. 154(b) by 0 days.

(21) Appl. No.: 15/154,914

(22) Filed: May 13, 2016

(65) Prior Publication Data

US 2016/0263539 A1  Sep. 15, 2016

Related U.S. Application Data

(60) Provisional application No. 62/113,407, filed on Mar. 13, 2015.

(51) Int. Cl.
| | |
|---|---|
| *A47J 31/46* | (2006.01) |
| *A47J 31/44* | (2006.01) |
| *B01F 7/16* | (2006.01) |
| *B01F 15/02* | (2006.01) |
| *B01F 3/12* | (2006.01) |

(52) U.S. Cl.
CPC ......... *A47J 31/462* (2013.01); *A47J 31/4403* (2013.01); *B01F 3/1221* (2013.01); *B01F 7/1615* (2013.01); *B01F 15/0251* (2013.01)

(58) Field of Classification Search
CPC .... A47J 31/4403; A47J 31/462; B01F 7/1615
USPC ........................................... 366/177.1, 181.1
See application file for complete search history.

(56) References Cited

U.S. PATENT DOCUMENTS

| | | | | |
|---|---|---|---|---|
| 4,015,749 | A * | 4/1977 | Arzberger | A47J 31/401 222/129.4 |
| 5,158,793 | A * | 10/1992 | Helbling | A47J 31/007 426/231 |
| 5,927,553 | A * | 7/1999 | Ford | A47J 31/401 222/113 |
| 8,162,210 | B2 | 4/2012 | McInerney et al. | |
| 8,359,968 | B2 | 1/2013 | Denisart et al. | |
| 8,978,928 | B2 | 3/2015 | Sinnema et al. | |
| 9,026,245 | B2 | 5/2015 | Tilton et al. | |
| 9,254,060 | B2 | 2/2016 | Butera et al. | |
| 2006/0007781 | A1* | 1/2006 | Martin | A47J 31/401 366/274 |

* cited by examiner

*Primary Examiner* — David L Sorkin
(74) *Attorney, Agent, or Firm* — Plumsea Law Group, LLC

(57) ABSTRACT

A single liquid protein beverage dispensing system is disclosed that automatically mixes a drink mix powder, such as protein powder, with a chilled or ambient temperature liquid, preferably water, to form a mixed protein liquid beverage or drink of uniform consistency. The system can provide for different amounts of water from a reservoir to be mixed with at least one or up to three different types of protein powders and then dispensed into a beverage container. The system has an electronic user interface by which the user can make various combinations of liquid amounts and powder selections to prepare a mixed drink. An advantageous feature of the system is that, because of the density and moisture content of every powder, the system provides vibration assistance for the powders to agitate during dispensing which prevents clumping of the powder in the liquid during mixing of the powder with the liquid to provide a beverage admixture of uniform consistency.

15 Claims, 6 Drawing Sheets

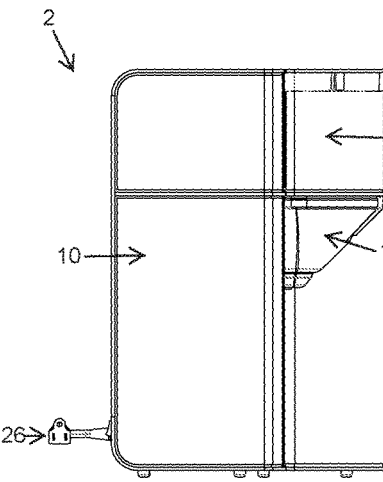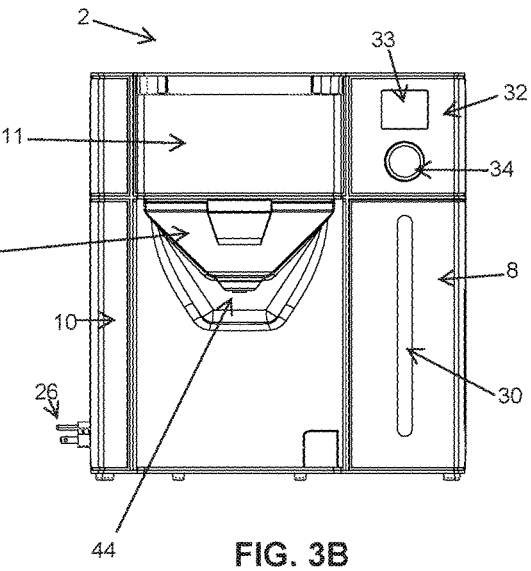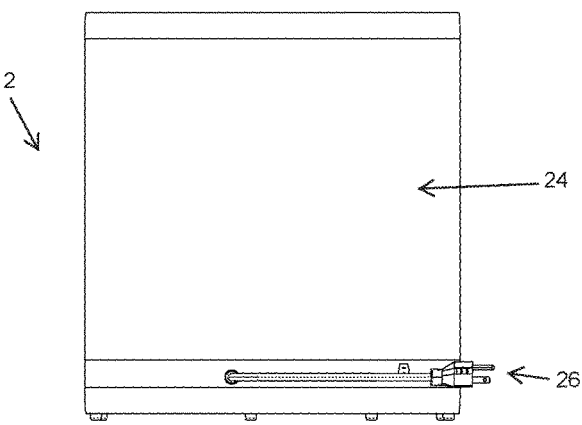
FIG. 3A    FIG. 3B
FIG. 3C

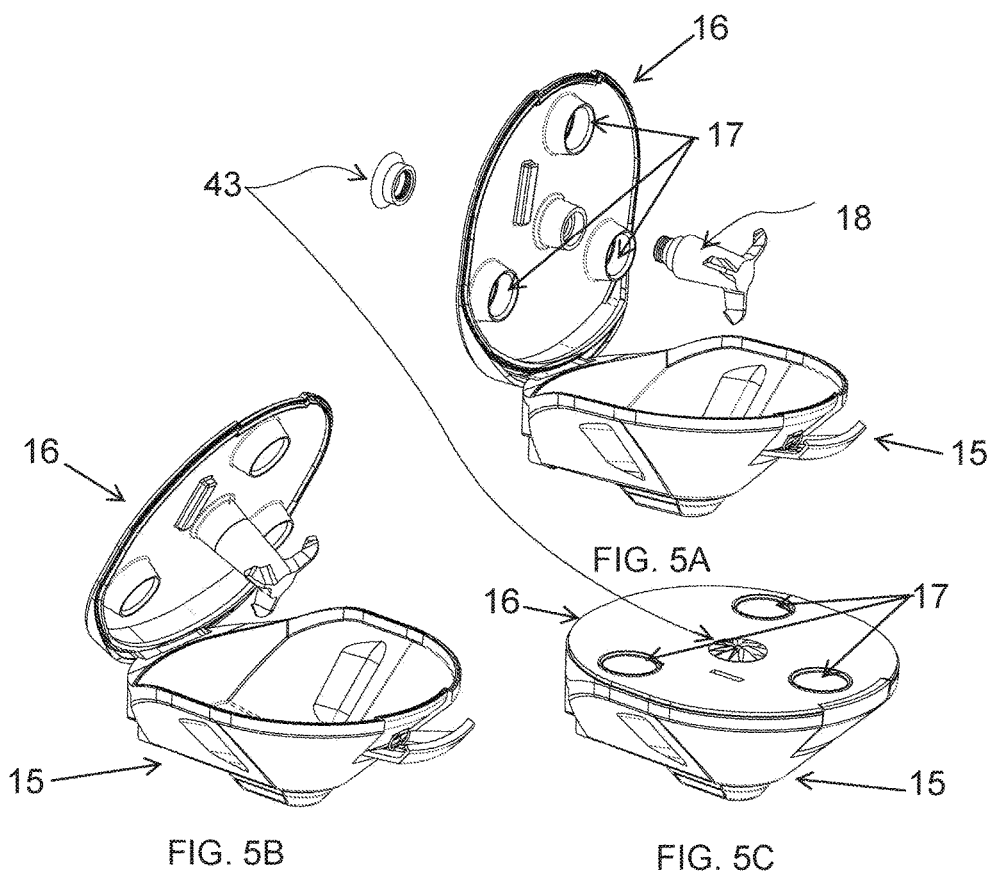
FIG. 5A
FIG. 5B
FIG. 5C
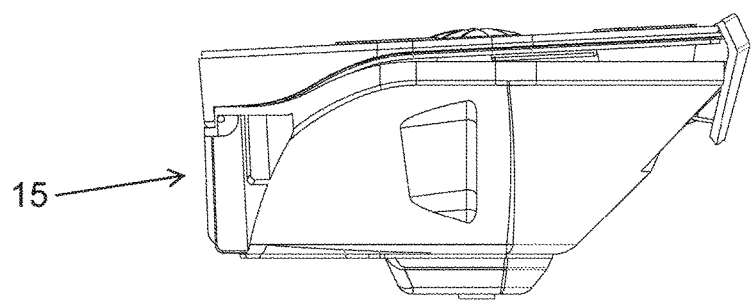
FIG. 5D

SINGLE LIQUID PROTEIN BEVERAGE DISPENSING SYSTEM

CROSS-REFERENCE TO RELATED APPLICATION

This application claims the benefit of priority under 35 U.S.C. § 119(e) from U.S. Provisional Application Ser. No. 62/113,407, filed Mar. 13, 2015, titled "Single Liquid Protein Beverage Dispensing System" and the entire contents of which are incorporated by reference herein and should be considered a part of this specification.

BACKGROUND OF THE INVENTION

Field of the Invention

The present invention is in the field of beverage dispensing systems, and more particularly, protein beverage dispensing systems.

Description of Related Art Including Information Disclosed under 37 CFR § 1.97 and 37 CFR § 1.98

Consumption of protein beverages before and after exercise has been proven important to help with the body recovery process and to maximize muscle gain. However, it is time consuming for a person manually to mix protein powder with water to make a protein beverage before and after a workout. This daily ritual for millions of people includes starting with a clean protein shaker bottle, scooping the right amount of protein powder into the shaker bottle, adding the right amount of water and shaking up the admixture to dissolve the protein powder in the water to create a protein beverage. Manually preparing a protein beverage requires extra time and inconvenience for a person to include preparing a clean shaker bottle, mixing the protein powder and water in the shaker bottle, and shaking the admixture to create a protein beverage, often resulting in a less-than-appealing, inconsistent admixture in which the powder is clumped or not uniformly dispersed or dissolved within the water. An alternative to manually preparing one's own protein beverage with protein powder and water is to buy prepared or premixed protein beverages, but these are more expensive than preparing one's own protein beverage as described. Additionally, nutrients can deteriorate when premixed with water or other liquids and the protein powder loses its potency and freshness. Various beverage mixing and dispensing systems or machines are known that attempt to solve the problem of manual preparation of a beverage.

U.S. Pat. No. 8,162,210 issued Apr. 24, 2012, by McInerney et al. for "Water and Drink Mix Vending Machine" discloses a liquid and drink mix vending machine that can vend both potable water and as an additional purchase option drink mixes (e.g., flavored drink mixes). The vending machine can include a liquid vending system and a drink mix vending system. The liquid vending system can vend different amounts of water, which can be delivered to a container provided by a user. The drink mix vending system can vend a variety of drink mixes, including drink mixes of different concentrations for a given quantity of water.

U.S. Pat. No. 8,359,963 issued Jan. 29, 2013, by Denisart et al. for "Control Device Having a Peristaltic Valve for a Drink Preparing Machine" discloses a drink preparing machine that includes a tank, a water supply system having at least a section for heated water and a section for unheated water, a pump for conveying water from the tank through the supply system as far as a module for preparing the drink, and a valve device arranged so as to control the selective opening and closing of the supply system sections. The valve device is a peristaltic system that includes a compression member for compressing a tube of each supply system section and acting under the effect of an elastic return member.

U.S. Pat. No. 8,978,928 issued Mar. 17, 2015, by Sinnema et al. for "Apparatus for Producing a Drink, and the Use of the Apparatus" discloses an apparatus for producing a drink, for example milk, from mixing a powder formula with a liquid, preferably water, the apparatus preferably being an automated baby-milk machine. The apparatus is configured to prepare a drink concentrate by mixing the amount of formula necessary for the total amount of drink in a certain amount of hot liquid, and to add the right amount of liquid of a certain low temperature to the concentrate in order to reach the end volume of the drink at a safe drinking temperature.

U.S. Pat. No. 9,026,245 issued May 5, 2015, by Tilton et al. for "Container-Less Custom Beverage Vending Invention" discloses methods and an apparatus describing a convenience beverage vending machine and its operation. An embedded computer interface allows consumers to create their own drinks or choose from a menu of drinks. Drinks are dispensed in a re-usable container. The beverages may be made from hot water, cold water or carbonated water that is mixed with various flavors of syrup, sweeteners and nutritional supplements. Identification may be presented and the computer recognizes the consumer and pulls up that consumer's account to determine funds available and previous drink selections and mixtures. The machine may incorporate an automatic cleaning cycle for both the valves and the dispense area.

U.S. Pat. No. 9,254,060 issued Feb. 9, 2016, by Butera et al. for "Multi-Beverage Vending Machine" discloses an instant drink vending machine. The instant drink vending machine has a water supply system for obtaining mixed warm water with a temperature selected among a set of pre-determined temperatures comprised between an upper and a lower value corresponding to temperatures of hot water and cold water to be mixed, said system including thermostatic shape memory alloy devices.

A disadvantage of these machines is that they are all mixing a beverage while dispensing the beverage in a one-step, continuous motion. Therefore, there is a need for a system, machine or apparatus that will first mix ingredients of a beverage, such as a dry ingredient with a liquid ingredient, and then dispense the mixed beverage. A single liquid protein beverage dispensing system of the present invention provides a solution to the problem of mixing then dispensing a resultant, consistent admixture of a mixed dry ingredient and liquid ingredient beverage.

BRIEF SUMMARY OF THE INVENTION

A single liquid protein beverage dispensing system of the present invention comprises a cabinet, wherein the cabinet houses a reservoir for storage of a liquid, which reservoir is in removable communication with the cabinet; a powder unit for storage of a powder, which powder unit has at least a powder chamber removably seated within the powder unit, and further which powder chamber has an agitator integral with an auger within the powder chamber; and a mixing unit for mixing of the liquid with the powder, which mixing unit is in communication with the powder unit, further which mixing unit has a mixing blade removably seated within the mixing unit, and further which mixing unit is in removable communication with the cabinet.

The system is configured to perform the sequential steps of a first step of dispensing the powder into the mixing unit, a second step of dispensing the liquid from the reservoir into the mixing unit, a third step of mixing the liquid and the powder in the mixing unit, and a fourth step of dispensing the mixed liquid and powder as an admixture beverage. Further, the system is configured to perform the second sequential step of dispensing the powder into the mixing unit while simultaneously agitating the agitator and dispensing the powder downward along the auger and out the powder chamber and into the mixing unit.

BRIEF DESCRIPTION OF THE SEVERAL VIEWS OF THE DRAWING(S)

FIG. 3A is a left side view of the system of the present invention.

FIG. 3B is a front view of the system of the present invention.

FIG. 3C is a back view of the system of the present invention.

FIG. 5A is a partially exploded, perspective view of a mixing unit of the system of the present invention with a mixing unit top plate in an open position.

FIG. 5B is another partially exploded, perspective view of a mixing unit of the system of the present invention with a mixing unit top plate in an open position.

FIG. 5C is a perspective view of a mixing unit of the system of the present invention with a mixing unit top plate in a closed position.

FIG. 5D is a left side view of a mixing unit of the system of the present invention with a mixing unit top plate in a closed position.

Figure 1:
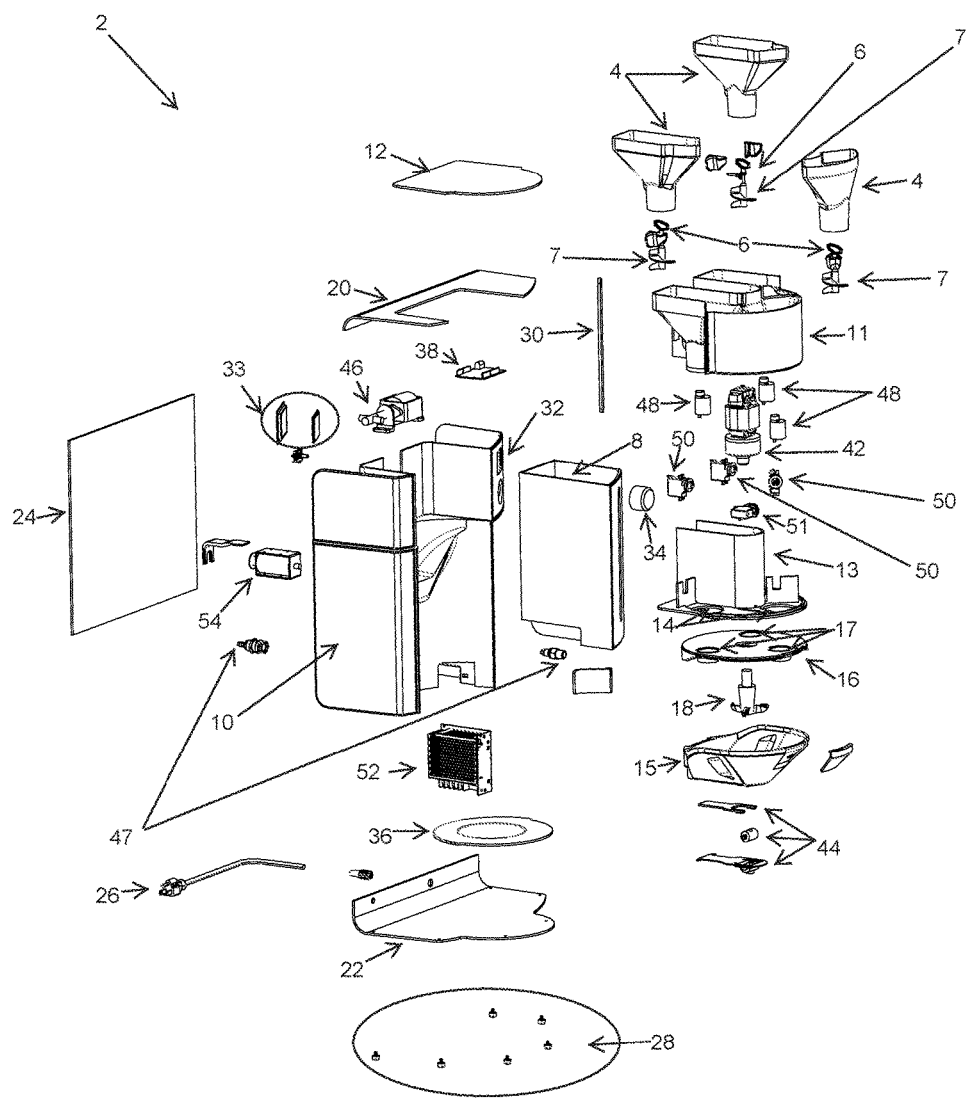
FIG. 1 is a perspective, exploded view of a single liquid protein beverage dispensing system of the present invention.
Figure 2A:
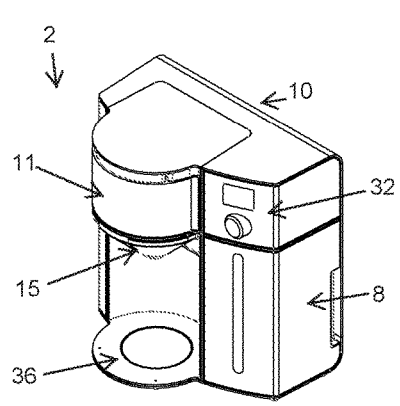
FIG. 2A is a top, front and right side perspective view of the system of the present invention.
Figure 2B:
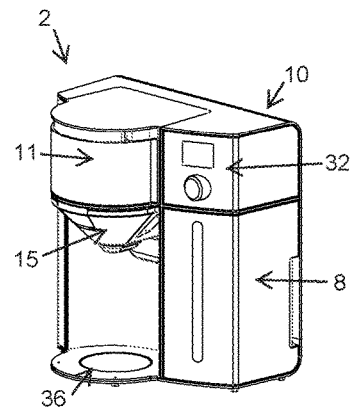
FIG. 2B is a front and right side perspective view of the system of the present invention.
Figure 2C:
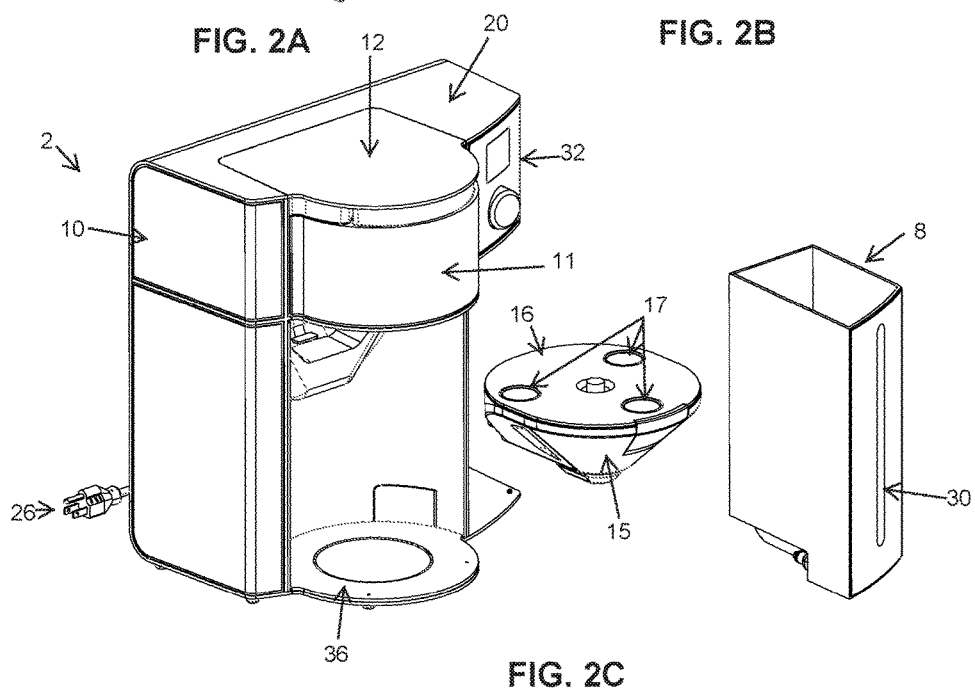
FIG. 2C is a top, front and right side perspective, partially exploded view of the system of the present invention.

LIST OF REFERENCE NUMERALS 2 dispensing system
4 powder chamber
6 agitator
7 auger
8 reservoir
10 cabinet
11 powder unit
12 powder unit top plate
13 powder unit bottom plate
14 powder chute opening
15 mixing unit
16 mixing unit top plate
17 mixing chute opening
18 mixing blade
20 cabinet top plate
22 cabinet bottom plate
24 cabinet back plate
26 power cord
28 cabinet feet
30 reservoir volume indicator
32 control panel
33 control display
34 control knob
36 container plate
38 electronic control unit
40 beverage container
42 mixing blade motor
43 mixing blade motor engagement gear
44 dispensing valve
46 reservoir pump
47 reservoir valve
48 powder unit vibration and agitation motor
50 powder unit powder chamber auger rotation and agitator operation motor
51 mixing unit lock servo motor
52 power supply
54 dispensing valve solenoid

DETAILED DESCRIPTION OF THE INVENTION

The advantages of the system of the present invention include, without limitation, convenience and time savings over traditional protein beverage or drink mixing and preparation methods. In a preferred broad embodiment, the system of the present invention is a single liquid protein beverage dispensing system.

The present invention is a single liquid protein beverage dispensing system. The system automatically mixes powdered protein with chilled, or ambient or room temperature, liquid or preferably, water, to form a mixed protein and liquid drink. The machine or system of the present invention provides convenience and admixture consistency over the traditional protein drink preparation manual shaker bottles. The single liquid protein beverage dispensing system of the present invention can deliver different amounts of liquid, preferably water, from a liquid reservoir container using an actuator. The system of the present invention allows a user to select from at least one or up to three different types of protein powders to mix with a liquid and dispense into a container provided by a user. The water may be maintained at room temperature in the dispensing system of the present invention or may be chilled with an actuator. A front panel of the system of the present invention has an electronic user interface and controls for a user to make selections of protein powder amounts and types and liquid amounts to be mixed to prepare and dispense a single liquid protein beverage. The electronic user interface may be operable manually, by touch screen or by wireless means such as a Bluetooth® technology compatible application such as for a smart phone or device.

Other benefits of the system of the present invention are its size and ease of maintenance. With reference to FIGS. 2A-2C and FIGS. 3A-3C, the system 2 of the present invention preferably has a compact footprint of from about 18" to about 24" in width, from about 12" to about 18" in height and from about 9" to about 15" in depth. The compact footprint allows the system 2 of the present invention to be easily accommodated on a counter and below a cabinet in a preparation area, such as a residential kitchen. The system 2 of the present invention is easy to maintain for cleanliness and has readily removable parts that may easily be removed by a user and may be cleaned manually or in a dishwasher.

Optionally, the system 2 of the present invention may have a means for performing a self-cleaning cycle. If the system 2 incorporates a self-cleaning cycle, then the system 2 may have a heating coil (not shown) placed in the line of operation for water dispensing such that the heating coil is interposed between the reservoir pump 46 and the reservoir 8 and the water would be heated as it is pumped from the reservoir 8 and dispensed into the mixing unit 15. The mixing unit 15 would then be operated to mix the heated water within the mixing unit 15 and then the water would be released from the mixing unit 15 by the dispensing value 44 into a container 40.

With reference FIGS. 2A-2C and FIGS. 3A-3C, the system 2 of the present invention is housed within a cabinet 10, which cabinet 10 communicates with a powder unit 11, a mixing unit 15 and a reservoir 8 for storage or holding a liquid, preferably water. The reservoir 8 optionally may have a reservoir volume indicator 30. The cabinet 10 further comprises a control panel 32 which provides a means by which a user provides operational instructions to the system 2, such as a control knob 34, and which displays operational options and user instruction selections of the system 2 by means of a control display 33 (see also FIG. 1 with control display 33 components as shown within the circled area). An electronic control unit 38 operates the system 2. The system 2 has a power supply 52 that is electrically powered by means of an external power source by connection with a power cord 26.

A powder unit top plate 12 is operational and may be opened to permit a user to add a protein powder or any other beverage powder to the powder unit 11. The reservoir 8 is in readily removable communication with the cabinet 10 and may be removed easily by a user from the system 2 by means of a quick-connect-and-release mechanism to allow for manual filling of the reservoir 8 with a liquid, as well as for cleaning of the reservoir 8. In operation of the system 2, a user places a beverage container 40 (see also FIG. 4B) on container plate 36 and beneath dispensing valve 44 of mixing unit 15 to receive a single liquid protein beverage as dispensed from the system 2.

Optionally, but not shown, the system 2 may have a domestic water line connected to the reservoir pump 46 to allow for a supply of water to be dispensed directly into mixing unit 15. Alternatively to reservoir pump 46, a solenoid valve (not shown) may be used to connect to a domestic water line and to allow for a supply of water to be dispensed directly into mixing unit 15. Use of a domestic water line may obviate the need for a reservoir 8 for the system 2.

Figure 4A:
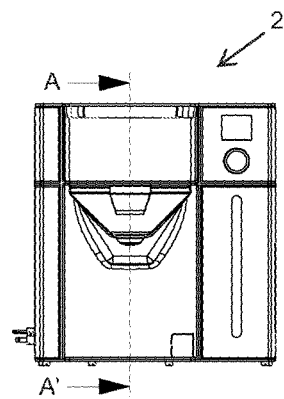
FIG. 4A is a front view of the system of the present invention having a cross-section line A-A'.
Figure 4B:
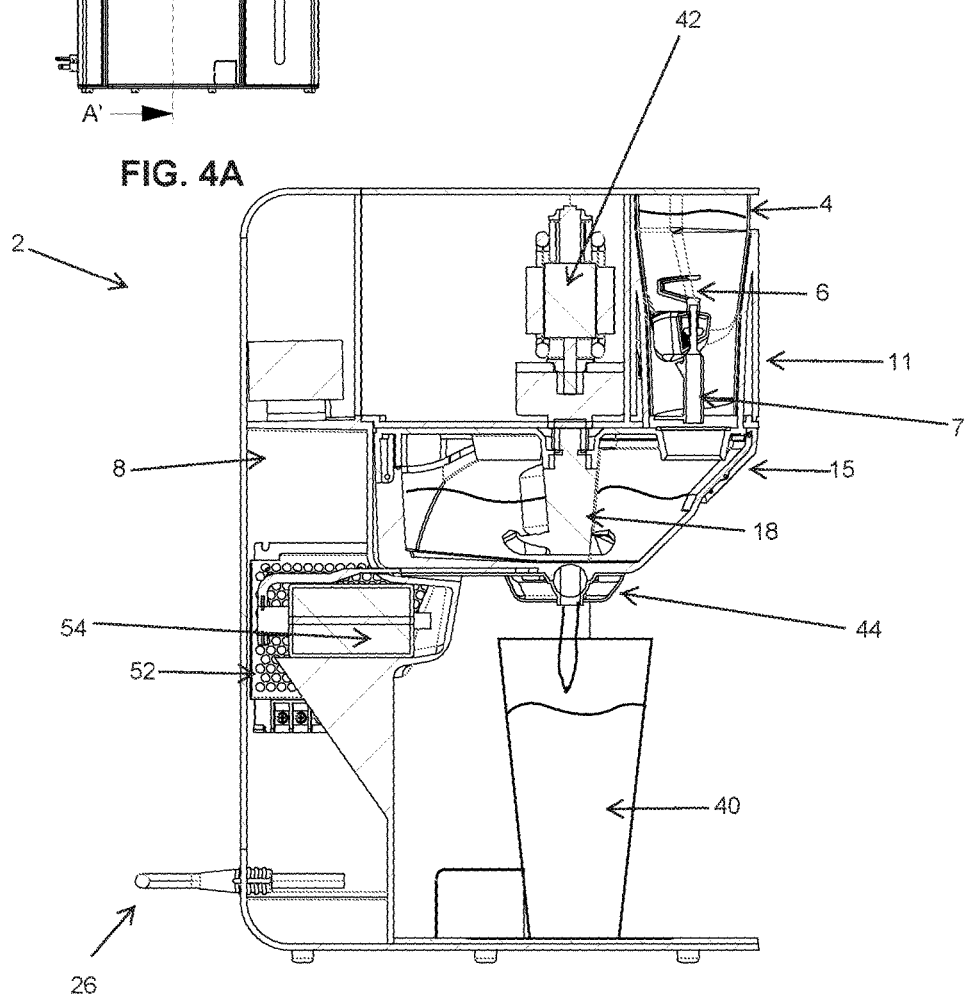
FIG. 4B is a left side, cross-sectional view of the system of the present invention taken along line A-A' of FIG. 4A.
Figure 6:
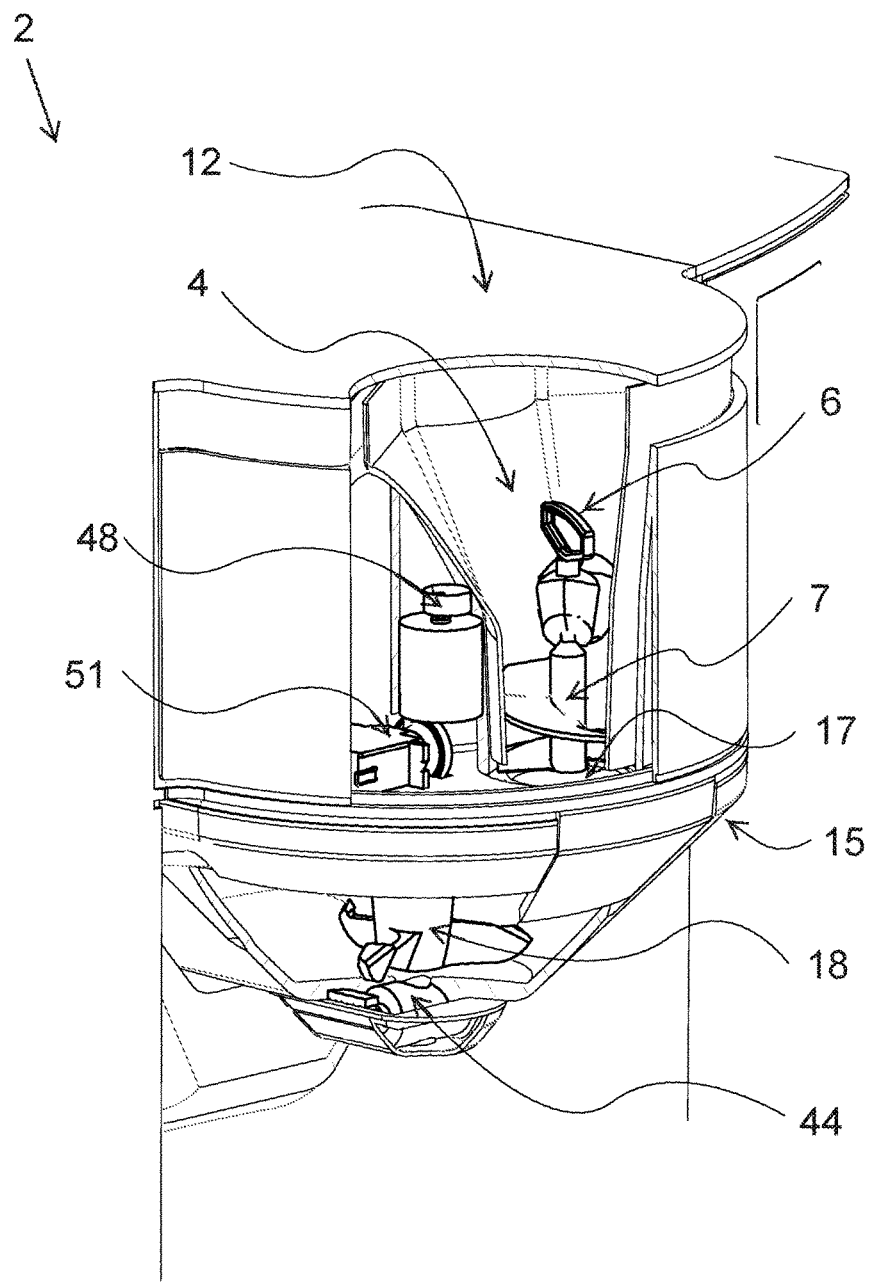
FIG. 6 is a partial, cut-away, perspective view of a mixing unit in relation with a powder unit of the system of the present invention.

With reference to FIG. 1, FIG. 4B and FIG. 6, the components of the system 2 are shown. The system 2 has a cabinet 10 that houses a powder unit 11, a mixing unit 15 and a reservoir 8. The cabinet 10 is enclosed on the top by a cabinet top plate 20, a cabinet bottom plate 22 and a cabinet back plate 24. Cabinet bottom plate 22 has cabinet supporting feet 28 as shown within the circled area in FIG. 1.

The system 2 has at least a powder chamber 4 and may have up to three powder chambers 4 to allow a user of the system 2 to fill the powder chambers 4 with same or different protein powders for preparing a single liquid protein beverage with the system 2. Within each powder chamber 4 is an agitator 6 that is integral with an auger 7. Each powder chamber 4 is removably seated within the powder unit 11 and each powder chamber 4 may be removed by a user of the system 2 for cleaning. The powder chamber 4 and powder unit 11 provide for storage of powder. The user of the system 2 may fill each powder chamber 4 by opening powder unit top plate 12 to access a powder chamber 4. Powder unit 11 is in communication with a mixing unit 15, which mixing unit 15 is in readily removable communication with the cabinet 10 and a user may easily remove the mixing unit 15 from the cabinet 10 by means of a quick-connect-and-release mechanism coupling with a mixing unit lock servo motor 51. After removal and when the mixing unit 15 is re-communicated with the cabinet 10, the mixing unit is releasably engaged with the cabinet 10 by means of a mixing unit lock servo motor 51.

In operation of the system 2, protein powder is released from the powder unit 11 through at least a powder chute opening 14 in a powder unit bottom plate 13 and into mixing unit 15 through at least a mixing chute opening 17 in a mixing unit top plate 16. As the protein powder is being released from a powder chamber 4 into mixing unit 15, powder unit powder chamber auger rotation and agitator operation motor 50 operates and turns agitator 6 to release protein powder via auger 7 into powder chute opening 14. Most drink powders, particularly protein powders, are hygroscopic and can tend to clump and that makes it difficult to mix and prepare a mixed drink of a user-pleasing, uniform consistency for consumption in which the powder is uniformly dispersed and dissolved or suspended within the liquid. An important advantageous feature of the system 2 of the present invention is that agitation of the protein powder simultaneous with release into the mixing unit 15 reduces or eliminates clumps to enable thorough dissolution and mixing of the powder with the liquid for a resultant, uniformly consistent, dispensed single liquid protein beverage admixture.

A liquid in reservoir 8 is introduced into mixing unit 15 by means of reservoir pump 46 and reservoir valve 47. The system 2 mixes the protein powder with the liquid in mixing unit 15 by means of mixing blade 18 which is operated by mixing blade motor 42. With reference to FIG. 5A, mixing blade 18 engages with mixing blade motor 42 by means of mixing blade motor engagement gear 43. The mixing blade 18 is in readily removable communication with the mixing unit 15 and the mixing blade 18 may be easily removed by a user for cleaning by a quick-connect-and-release means of the mixing blade motor engagement gear 43. The liquid in reservoir 8 either may be optionally chilled by the system 2 prior to mixing the liquid with a powder or may be used by the system 2 at ambient or room temperature for mixing the liquid with a powder.

With reference to FIG. 1, FIGS. 2A-2C, FIG. 3B, FIG. 4B and FIG. 6, as stated, there is at least one and preferably two or three protein powder chambers 4 which hold protein powders or other dry powder mixes suitable for consumption with a liquid, preferably water. The system 2 of the present invention has a control panel 32 with a control display 33 and control knob 34 that enables the user to select different beverage or drink sizes, of varying liquid amounts, and beverage or drink combinations, of powder mixes from powder chambers 4. Each powder chamber 4 can hold up to about 20 ounces of a dry powder mix, such as protein powder. Reservoir 8 can holds up to about 96 ounces of a liquid, such as water. The remaining liquid or water level or volume in reservoir 8 can be determined by reference to reservoir volume indicator 30. Once the user makes his or her beverage option selections using control panel 32, the resulting mixed liquid and powder beverage is dispensed via dispensing valve 44 into a beverage container 40 placed upon container plate 36. Dispensing valve 44 is operated by dispensing valve solenoid 54.

The cabinet 10 of the system 2 can accommodate a beverage container 40 up to about 12" in height and which has an opening therein from 1" to about 6" in diameter through which to receive a dispensed beverage into the beverage container 40. Preferably, the beverage container 40 is capable of holding from at least about 8 ounces to about 48 ounces of liquid.

The cabinet 10 (including cabinet top plate 20, cabinet bottom plate 22, cabinet back plate 24, container plate 36), reservoir 8 (including reservoir volume indicator 30), powder unit 11 (including powder chambers 4, agitator 6, auger 7, powder unit top plate 12, powder unit bottom plate 13) and mixing unit 15 (including mixing unit top plate 17, mixing blade 18) of system 2 may be made of any sufficiently suitable, rigid and strong material such as plastic, metal, and the like, which, preferably, are of food safety grade.

With reference to all FIGS. 1-6, the system 2 of the present invention is operated by a user as follows. First, a user fills each powder chamber 4 having an agitator 6 and an auger 7 with the user's preferred drink mix or protein powders. Second, the removable and modular reservoir 8 may be removed by a user from the cabinet 10 of the system 2 and filled with a liquid, preferably water. Third, the reservoir 8 is recoupled with the system 2 via an integrated quick-connect-and-release water line coupler or reservoir valve 47. Then using the control panel 32 with control knob 34 (which may be a rotary dial) and control display 33 (which may be an LCD or touch screen user interface) having settings, instructions or text prompts for the user, the user selects the volume of the desired beverage or mixture (e.g., 4 ounces, 8 ounces, etc.), then selects an amount or 'scoops' of drink mix or protein powder from each of the desired powder chambers 4 (e.g., 1, 2 or 3 scoops, such as may comprise a single selection from one, two or three powder chambers 4 or any combination thereof). Once the user's desired liquid and powder amounts and combination selections are made, the user confirms preparation and dispensing of the beverage by operating or pressing the control knob 34.

Upon confirmation, the system 2 operates and provides for each of the protein powders as they were selected by the user to be simultaneously agitated by agitator 6 and dispensed downward along auger 7, out of powder chamber 4, through powder chute opening 14 and into the mixing unit 15 by use of vertically oriented auger 7 bits within the powder chamber 4 and the powder chute opening 14, as assisted by both vibrational motors, which are the powder unit vibration and agitation motor 48 and the powder unit powder chamber auger rotation and agitator operation motor 50, and the mechanical agitators 6, which are respectively adjacent to and within each powder chamber 4. This is then followed by the pumping of a liquid or water from the modular water reservoir 8 via an electric reservoir pump 46 into the mixing unit 15. Once the water volume is filled as specified by the user, the mixing blade motor 42 is started and the powder and water are mixed together via the mixing blade 18 within mixing unit 15. Once the timed mixing sequence has completed and the mixing blade motor 42 is stopped, a dispensing valve solenoid 54 is activated to open the dispensing valve 44 and the resultant mixed drink or beverage admixture is dispensed into a beverage container 40 placed upon container plate 36 by the user.

Other advantages of the system 2 of the present invention are: (1) the blending mechanism for the system 2 comprising the powder unit vibration and agitation motor 48 is inverted or upside down which aides in agitation and vibration of the powder chambers 4 during dispensing through the power chute opening 17 as described above; (2) auger 7 assists with dispensing the powder by means of vertically linear motion as opposed to a usual rotary motion; (3) mixing unit lock servo motor 51 is mounted on an outside of the mixing unit 15 and provides for a right angle engagement with powder unit vibration and agitation motor 48; (4) the drink mix or protein powder is agitated during release into mixing unit 15 to reduce or eliminate clumping of the powder and to facilitate consistent mixing of the powder with a liquid; (5) the ability of the system 2 to dispense multiple types of powder in one sequence or step and which powder amounts may be defined by volume allowing for multi-variable programming for mixing of powders selected from powder chambers 4; (6) the modular powder chambers 4 are scalable in size and are able to be replaced with larger or smaller chambers; (7) in operating the system 2 to prepare a single liquid protein powder mixed beverage, it is done in three sequential steps in that first the powder and then second the liquid are individually and sequentially dispensed into mixing unit 15 and then third the powder and liquid are mixed together in the mixing unit 15; such that the powder is dispensed from the powder unit 11 into the mixing unit 15, then the water fills the mixing unit 15, and then the powder and liquid are mixed together; (8) the system 2 has a single electronic control unit 38 on the inside of the cabinet 10 and a control panel 32 comprising a control display 33 (such as an LCD screen) and a control knob 34; (9) because of the density and moisture content of every powder, an advantageous feature of the system 2 is that it provides vibration assistance for the powders to agitate during dispensing and which prevents clumping of the powder and provides uniformly dispersed powder into the mixing unit; (10) the system 2 may have an optional safety feature or switch so that the system 2 cannot be operated if the mixing unit 15 is not in communication with the cabinet 10; and (11) the system 2 may have an optional self-cleaning mode, or a means to remind the user after the system 2 has been operated a certain number of times (this may be per cycle time in the system 2 memory) that the user should remove the reservoir 8, powder chambers 4 (with integral agitator 6 and auger 7) or mixing unit 15 (and mixing blade 18) and clean these components before operating the system 2 again.

Although the present invention has been described with reference to specific embodiments, it is understood that modifications and variations of the present invention are possible without departing from the scope of the invention, which is defined by the claims set forth below.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

The invention claimed is:

1. A single liquid protein beverage mixing and dispensing system comprising:
   a. a cabinet, wherein the cabinet houses a liquid reservoir, a powder unit, a mixing unit, a dispensing system, and a control unit;
   b. the liquid reservoir being configured to dispense a liquid into the mixing unit after the powder unit dispenses a powder into the mixing unit, the liquid reservoir being removable from the cabinet;
   c. the powder unit for storage of a protein powder including an agitator and an auger configured to dispense the powder into the mixing unit, the agitator being integral with the auger;
   d. the mixing unit containing an mixing blade to mix the liquid with the protein powder and to dispense the mixed liquid and powder as an admixture beverage, wherein the mixing unit is in communication with the powder unit and the liquid reservoir, and further wherein the mixing unit is removable from the cabinet; and e. the dispensing system being a part of the mixing unit and including a dispensing valve, the dispensing system being configured to direct the movement of admixture beverage into a removable beverage container;

wherein the agitator, auger, and mixing blade are each located vertically above the removable beverage container; and wherein the mixing blade is disposed facing downward towards the removable beverage container, oriented inverted relative to the earth.

2. The single liquid protein beverage mixing and dispensing system of claim 1 further comprising three powder chambers within the cabinet.

3. The single liquid protein beverage mixing and dispensing system of claim 1, wherein
the auger is configured to dispense the powder by means of linear motion; and wherein the auger is configured to dispense a prescribed amount of powder into the mixing unit as selected by a user.

4. The single liquid protein beverage mixing and dispensing system of claim 1, wherein the mixing blade is orientated within the mixing unit such that the mixing blade rotates on a plane that is perpendicular to the movement of admixture beverage into the removable beverage container.

5. The single liquid protein beverage mixing and dispensing system of claim 1 wherein the powder unit includes a vibration and agitation motor that is configured to operate the agitator to release the powder via the auger into a powder chute opening that connects to the mixing unit.

6. The single liquid protein beverage mixing and dispensing system of claim 1, further comprising a container plate disposed beneath the dispensing valve for receiving the removable beverage container.

7. The single liquid protein beverage mixing and dispensing system of claim 3 further wherein the system is configured to agitate the power with the agitator, and simultaneously dispense the agitated powder using the augur auger downward along the auger axis and out of the powder unit and into the mixing unit.

8. A single liquid protein beverage mixing and dispensing system comprising:
a. a cabinet, wherein the cabinet houses a liquid reservoir, a powder unit, a mixing unit, a dispensing system, and a control unit;
b. the liquid reservoir being configured for storage of a liquid and to dispense the liquid into a mixing unit after the powder unit dispenses a powder into a mixing unit, which reservoir is removable from the cabinet;
c. the powder unit for storage of a protein powder, which powder unit has at least two powder chambers removably seating within the powder unit, and further each of which powder chamber has an agitator integral with an auger within the powder chamber; wherein the auger assists with dispensing the protein powder by means of vertically linear motion;
d. the mixing unit containing an mixing blade disposed inverted relative to the Earth for mixing of the liquid with the protein powder and to dispense the mixed liquid and powder as an admixture beverage, which mixing unit is in communication with the powder unit, and further which mixing unit is removable from the cabinet;

e. the dispensing system including a dispensing valve as part of the mixing unit, the dispensing system being configured to direct the flow of admixture beverage into a removable beverage container; and a control unit with a plurality of selectable programming buttons which allows a user to select variable amounts of powder and liquid; wherein the control unit is in communication with the liquid reservoir and the powder unit such that the control unit is configured to regulate the amount of liquid and amount of powder dispensed into the mixing unit per the selected amounts; and wherein the control unit is also in communication with the mixing unit to mix and dispense admixture beverage into the removable beverage container;

wherein the system is configured to agitate the power in the powder unit with the agitator, and simultaneously dispense the agitated powder using the auger downward out of the powder unit and into the mixing unit.

9. The single liquid protein beverage mixing and dispensing system of claim 8 wherein the control unit:
activates the mixing blade for a timed mixing sequence;
stops the mixing blade when the timed mixing sequence is completed;
activates a dispensing valve solenoid to open the dispensing valve, allowing the mixture beverage to exit the mixing unit and flow into the removable beverage container.

10. The single liquid protein beverage mixing and dispensing system of claim 8 wherein the agitator, auger, and mixing blade are each located vertically above the removable beverage container;
wherein the mixing blade is disposed facing downward towards the removable beverage container; and
the mixing blade is orientated within the mixing unit such that the mixing blade rotates on a plane that is perpendicular to the movement of admixture beverage into the removable beverage container.

11. The single liquid protein beverage mixing and dispensing system of claim 8, wherein the control unit is configured to dispense protein power from each of the two power chambers in amounts selected by the user.

12. The single liquid protein beverage mixing and dispensing system of claim 8,
wherein the powder unit includes three powder chambers; and
wherein the control unit is configured to dispense protein power from each of the three powder chambers in amounts selected by the user.

13. The single liquid protein beverage mixing and dispensing system of claim 8, wherein the agitator and auger are oriented within the powder unit such that they face vertically upward, away from the mixing chamber, such that the protein powder is drawn downward into the mixing chamber by the auger.

14. The single liquid protein beverage mixing and dispensing system of claim 8,
wherein the powder unit further includes a plurality of vibration motors located in proximity to an outside of the powder unit, the plurality of vibration motors being configured to assist in releasing power from the powder unit; and
wherein the powder unit further comprises an auger operation motor, the auger operation motor being configured to rotate the agitator and the auger;
wherein the plurality of vibration motors and the auger operation motor are configured to aid in releasing the protein powder from the powder unit downwards into a powder chute opening that connects to the mixing unit.

15. The single liquid protein beverage mixing and dispensing system of claim 1, wherein the control unit:
includes a plurality of selectable programming buttons which allows a user to select drink mixture operating parameters including variable amounts of powder and liquid;
is in communication with the liquid reservoir and the powder unit such that the control unit is configured to regulate the amount dispensed into the mixing unit per the operating parameters;
is also in communication with the mixing unit to mix and dispense admixture beverage into the removable beverage container; and
is also in communication with the liquid reservoir, the liquid pump, and the heating element such that the control unit is configured to perform a self-cleaning cycle to remove any residual admixture in the mixing unit after use.

* * * * *